(12) United States Patent
Zuritis

(10) Patent No.: US 8,939,143 B2
(45) Date of Patent: Jan. 27, 2015

(54) SOLAR ARRAY COLUMN CAP

(76) Inventor: Michael Zuritis, Ballston Lake, NY (US)

( * ) Notice: Subject to any disclaimer, the term of this patent is extended or adjusted under 35 U.S.C. 154(b) by 802 days.

(21) Appl. No.: 13/103,475

(22) Filed: May 9, 2011

(65) Prior Publication Data

US 2012/0073563 A1 Mar. 29, 2012

(51) Int. Cl.
*F24J 2/52* (2006.01)

(52) U.S. Cl.
CPC .............. *F24J 2/526* (2013.01); *F24J 2/5232* (2013.01); *Y02E 10/47* (2013.01)
USPC ............... 126/569; 52/835; 52/301; 52/834; 211/41.1

(58) Field of Classification Search
CPC ................... F24J 2/526; F24J 2/5232
USPC ......... 126/680, 704; 248/218.4, 219.1, 219.2, 248/219.4, 73, 74.1, 207; 29/890.033; 136/244; 52/93.2, 173.3, 204
See application file for complete search history.

(56) References Cited

U.S. PATENT DOCUMENTS

| | | | | |
|---|---|---|---|---|
| 1,024,761 A * | 4/1912 | Anderson | | 52/301 |
| 2,552,915 A * | 5/1951 | Zachrich | | 248/154 |
| 2,664,977 A * | 1/1954 | Starcevich | | 52/301 |
| 3,006,669 A * | 10/1961 | Novales | | 403/217 |
| 3,624,780 A * | 11/1971 | Elliott et al. | | 211/107 |
| 4,182,362 A * | 1/1980 | Hewson et al. | | 137/340 |
| 4,284,100 A * | 8/1981 | Scapes et al. | | 137/343 |
| 4,635,677 A * | 1/1987 | Linderman et al. | | 137/356 |
| 5,014,940 A * | 5/1991 | Sherman | | 248/74.1 |
| 5,028,020 A * | 7/1991 | Sundholm | | 248/74.4 |
| 5,039,039 A * | 8/1991 | Schaffer | | 248/59 |
| 5,125,608 A * | 6/1992 | McMaster et al. | | 248/163.1 |
| 5,174,535 A * | 12/1992 | Stubbersfield | | 248/316.1 |
| 5,181,355 A * | 1/1993 | Skolnick et al. | | 52/81.3 |
| 5,215,281 A * | 6/1993 | Sherman | | 248/74.1 |
| 5,307,603 A * | 5/1994 | Chiodo | | 52/698 |
| 5,488,810 A * | 2/1996 | Horton | | 52/715 |
| 5,926,151 A * | 7/1999 | Hagiwara et al. | | 343/882 |
| 6,173,931 B1 * | 1/2001 | Johnson et al. | | 248/222.11 |
| 6,342,870 B1 * | 1/2002 | Mehrkens et al. | | 343/891 |
| 6,508,446 B1 * | 1/2003 | Addison et al. | | 248/218.4 |
| 6,520,462 B2 * | 2/2003 | Herron | | 248/218.4 |
| 6,520,469 B1 * | 2/2003 | DiMauro | | 248/345.1 |
| 6,561,473 B1 * | 5/2003 | Ianello | | 248/219.4 |
| 6,722,357 B2 * | 4/2004 | Shingleton | | 126/600 |
| 6,739,561 B2 * | 5/2004 | Herzog | | 248/218.4 |

(Continued)

*Primary Examiner* — Avinash Savani
(74) *Attorney, Agent, or Firm* — Schmeiser, Olsen & Watts, LLP

(57) ABSTRACT

Disclosed herein is a solar array column cap that includes a main body extending between a left side and a right side to define a channel, the channel configured to at least partially receive a vertical column of a solar array support structure such that the main body surrounds the vertical column. The main body further includes a left flange extending radially outwardly from the left side of the channel and right flange extending radially outwardly from the right side of the channel. Further, the main body includes an left upper flap extending from a top edge of the left flange, and a right upper flap extending from a top edge of the right flange, the right upper flap and left upper flap being co-planar. In another embodiment, a body has an opening extending along a center axis from a bottom to a top, the opening configured to receive the vertical column such that the body surrounds the vertical column, and an upper support surface configured to receive a horizontal beam, the upper support surface being located in a plane that is non-perpendicular with the center axis.

20 Claims, 14 Drawing Sheets

(56) References Cited

U.S. PATENT DOCUMENTS

| | | | |
|---|---|---|---|
| 6,766,992 B1* | 7/2004 | Parker | 248/300 |
| 6,768,474 B2* | 7/2004 | Hunt | 343/892 |
| 6,802,484 B1* | 10/2004 | Kiley et al. | 248/311.2 |
| 7,113,145 B1* | 9/2006 | Noble | 343/892 |
| 7,448,590 B1* | 11/2008 | Holton | 248/534 |
| 7,497,368 B2* | 3/2009 | Lutzke | 232/39 |
| 7,531,741 B1* | 5/2009 | Melton et al. | 136/246 |
| 7,770,848 B2* | 8/2010 | Johnson et al. | 248/65 |
| 7,857,269 B2* | 12/2010 | Plaisted et al. | 248/237 |
| 7,891,953 B2* | 2/2011 | Gray et al. | 416/246 |
| 7,958,886 B2* | 6/2011 | Barsun et al. | 126/600 |
| 8,177,180 B2* | 5/2012 | Plaisted et al. | 248/237 |
| 8,336,837 B2* | 12/2012 | Gephart et al. | 248/218.4 |
| 8,413,391 B2* | 4/2013 | Seery et al. | 52/173.3 |
| 8,495,997 B1* | 7/2013 | Laubach | 126/680 |
| 8,544,221 B2* | 10/2013 | Marley | 52/173.3 |
| 8,550,419 B2* | 10/2013 | Hausner et al. | 248/370 |
| 8,573,545 B2* | 11/2013 | Walquist et al. | 248/122.1 |
| 8,602,798 B2* | 12/2013 | Downing | 439/100 |
| 2002/0130232 A1* | 9/2002 | Herron | 248/218.4 |
| 2002/0162924 A1* | 11/2002 | Herzog | 248/218.4 |
| 2006/0231706 A1* | 10/2006 | Wyatt | 248/218.4 |
| 2009/0188751 A1* | 7/2009 | Gilliam | 182/112 |
| 2009/0223142 A1* | 9/2009 | Shingleton et al. | 52/71 |
| 2009/0256046 A1* | 10/2009 | Hausner et al. | 248/398 |
| 2010/0089389 A1* | 4/2010 | Seery et al. | 126/608 |
| 2010/0139646 A1* | 6/2010 | Barsun et al. | 126/600 |
| 2010/0276558 A1* | 11/2010 | Faust et al. | 248/222.14 |
| 2011/0173900 A1* | 7/2011 | Plaisted et al. | 52/97 |

* cited by examiner

US 8,939,143 B2

SOLAR ARRAY COLUMN CAP

FIELD OF THE TECHNOLOGY

The subject matter disclosed herein relates generally to solar arrays. More particularly, the subject matter relates to an end cap for connecting a vertical column with a horizontal beam for a solar array support structure.

BACKGROUND

Renewable energy sources are becoming more popular with the rising cost of oil and other non-renewable energy resources. Solar energy is one of these renewable energy sources, and has proven desirable to harness in many circumstances. One method of harnessing solar energy is to install a structural array of solar panels, or a solar array, such that the solar panels each face the sun to achieve sunlight absorption. Solar arrays typically include two sets of vertical columns that extend from the ground. Each set of vertical columns are generally attached with a horizontal beam. In order to attach the vertical columns to the horizontal beams, column caps are utilized. These column caps structurally support significant loads from the solar array. However, many existing column caps use excessive steel or aluminum material, deform with loading, and are difficult to install. They also are cast from steel or aluminum and require welding and machining to fabricate, increasing cost. Further, many existing column caps are configured to attach a horizontal beam with a circular cross section. As such, these column caps are not ideal for situations where the solar array utilizes horizontal beams with a rectangular or square cross section.

Thus, improved column caps for solar arrays would be well received in the art.

BRIEF DESCRIPTION

According to one aspect, a solar array column cap comprises: a main body extending between a left side and a right side to define a channel, the channel configured to at least partially receive a vertical column of a solar array support structure such that the main body surrounds the vertical column; a left flange extending radially outwardly from the left side of the channel; a right flange extending radially outwardly from the right side of the channel; a left upper flap extending from a top edge of the left flange; and a right upper flap extending from a top edge of the right flange, the right upper flap and left upper flap being co-planar.

According to another aspect, a solar array support structure comprises: a vertical column extending from the ground to an upper end; an column cap attached to the upper end of the vertical column, the column cap including: a main body defining a channel extending at least partially around the vertical column; a left flange extending from the main body radially outwardly with respect to the vertical column; a right flange extending from the main body radially outwardly with respect to the vertical column; a left upper flap extending from a top edge of the left flange; and a right upper flap extending from a top edge of the right flange; a horizontal beam resting on the column cap; and a U-bolt connecting the horizontal beam to the left and right upper flaps.

According to another aspect, a solar array column cap comprises: a body having an opening extending along a center axis from a bottom to a top, the opening configured to receive the vertical column such that the body surrounds the vertical column; and an upper support surface configured to receive a horizontal beam, the upper support surface being located in a plane that is non-perpendicular with the center axis.

According to another aspect, a solar array support structure comprises: a vertical column extending from the ground to an upper end; an column cap attached to the upper end of the vertical column, the column cap including: a body having an opening extending along a center axis from a bottom edge to a top edge, the opening configured to receive the vertical column such that the body surrounds the vertical column; and an upper support surface configured to receive a horizontal beam, the upper support surface being located in a plane that is non-perpendicular with the center axis; and a horizontal beam resting on the column cap, the horizontal beam comprising at least one of a rectangular and square cross section.

According to another aspect, a solar array column cap comprises: a first body portion extending between a left side and a right side to define a first channel, the first channel configured to at least partially receive a vertical column of a solar array support structure such that the first body portion at least partially surrounds the vertical column, the first body portion including a left flange extending radially outwardly from first channel and a right flange extending radially outwardly from the first channel; a second body portion extending between a left side and a right side to define a second channel, the second channel configured to at least partially receive the vertical column such that the first body portion at least partially surrounds the vertical column, the second body portion including a left flange extending radially outwardly from second channel and a right flange extending radially outwardly from the second channel; and an angle iron having a first angle portion extending between the first body portion and the second body portion and a second angle portion comprising an upper surface configured to receive a horizontal beam of the solar array support structure.

A solar array support structure comprising: a front vertical column; a rear vertical column; an end cap attached to an extending end of the front vertical column; and a horizontal cross beam attached to the end cap and extending to the rear vertical column.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
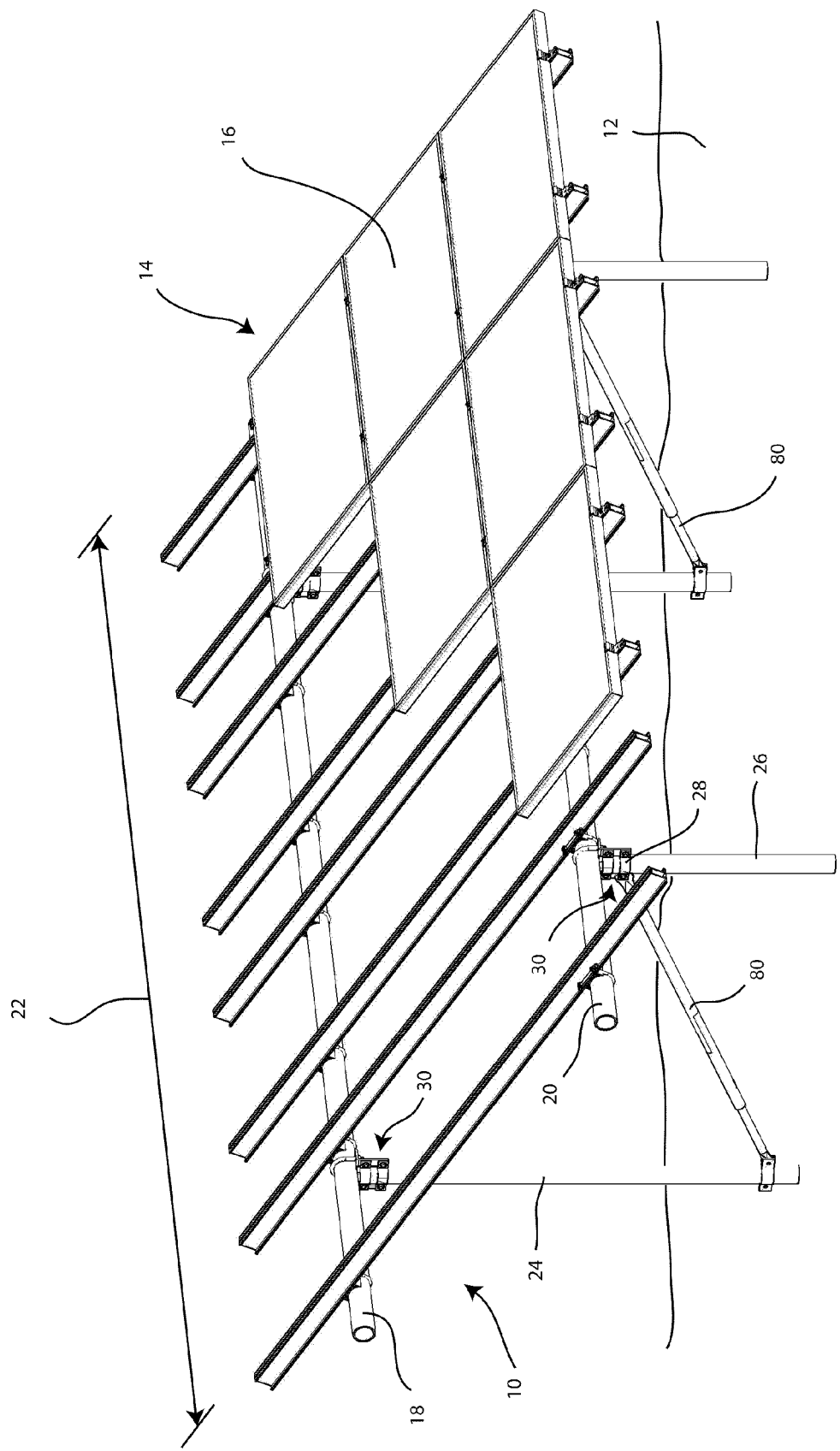
FIG. 1 depicts a perspective view of a solar array support structure in accordance with one embodiment.

Referring firstly to FIG. 1, a solar array support structure 10 is shown according to one described embodiment, after having been installed in the ground 12 and having a partial array 14 of solar panels 16 mounted thereon. The solar array support structure 10 is configured to receive the solar panels 16 such that the solar panels 16 are each tilted at a predetermined angle θ that may maximize sunlight absorption. The solar array support structure 10 comprises a top horizontal beam 18 and a bottom horizontal beam 20 running a length 22 of the solar array support structure 10. A plurality of rear support columns 24 extend substantially vertically from the top horizontal beam 18 while a plurality of front support columns 26 extend substantially vertically from the bottom horizontal beam 20. These vertical columns 24, 26 are installed into the ground 12 such that the solar array support structure 10 is secured therein. The solar array support structure includes a plurality of column caps 28 that facilitate connection of the horizontal beams 18, 20 with the vertical columns 24, 26.

Figure 2:
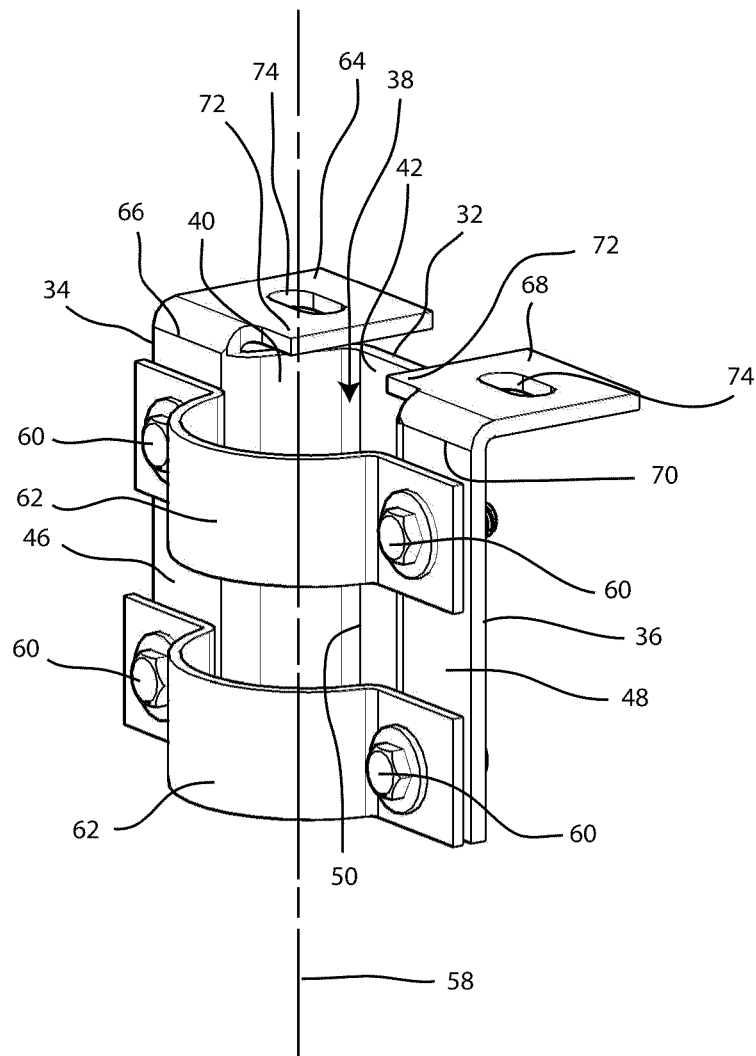
FIG. 2 depicts a perspective view of an column cap in accordance with one embodiment.

One of the column caps 28 is shown by itself in FIG. 2. The column cap 28 is configured to slide onto an extended end 30 of one of the vertical column 24, 26. The solar array support structure 10 includes one of the column caps 28 for each vertical column 24, 26. The column cap 28 includes a main body 32 extending between a left side 34 and a right side 36 to define a channel 38. The channel 38 is configured to at least partially receive one of the vertical columns 24, 26 such that the main body 32 surrounds the vertical column 24, 26. The channel 38 may be defined by a left wall 40, a middle wall 42, and a right wall 44. The channel 38 may have bends 46 separating the left wall 40, the middle wall 42 and the right wall 44. In other embodiments, the channel 38 portion of the main body 32 may be semi-cylindrical in shape. However, any shape that is configured to receive and surround the vertical column 24, 26 is contemplated.

The column cap 28 includes a left flange 46 extending radially outwardly from the left side 34 of the channel 38. Likewise, the column cap 28 includes a right flange 48 extending radially outward from the right side 36 of the channel 38. A bend 50 is located between the left flange 46 and the left wall 40, and a bend 52 is located between the right flange 48 and the right wall 44. The left flange 46 and the right flange 48 are shown to be co-planar in the embodiment depicted in the Figures. This is because the channel 38 is configured to surround half of the vertical column 24, 26. However, in other embodiments, the channel 38 may surround more or less than the embodiment, depicted, and the flanges 46, 48 may not be co-planar. In other embodiments, the flanges 46, 48 may simply be bended more or less at the bends 50, 52 to create non-planar flanges 46, 48.

The flanges 46, 48 may each include one or more openings 54, 56. The openings 54 on the left flange 46 may correspond to the openings 56 on the right flange 48. The openings 54, 56 may be spaced evenly or unevenly along the height of the column cap 28 and may be utilized to receive bolts 60 for bolting a U-clamp 62 to the flanges 46, 48. In the embodiment depicted, two U-clamps 62 are shown. However, it should be understood that more or less than two U-clamps 62 and corresponding openings 54, 56 are contemplated. The U-clamps 62 may secure the column cap 28 to the extended end 30 of the vertical column 24, 26. Thus, in operation, an installer (not shown) may first drive the vertical columns 24, 26 into the ground. Once the vertical columns 24, 26 are in the correct place, the installer may then place the main body 32 of the column cap 28 such that it surrounds the extended end 30 of the vertical columns 24, 26. Then, the installer may secure the column cap 28 by clamping the U-clamps 62 to the main body 32 with the bolts 60. While U-clamps are shown in this embodiment, it should be understood that other attachment means are contemplated. For example, a second main body (not shown) that is substantially similar to the main body 32 may be locked into place with bolts to surround the vertical columns 24, 26, similar to the embodiment shown in FIGS. 7-12 described hereinbelow. In another embodiment, a single U-clamp (not shown) that extends for the entire length of the column cap and includes multiple bolt openings on each side may also be utilized. Furthermore, the U-clamps 62 may not be rounded, but may be flat and bent to accommodate rectangular or square vertical columns 24, 26.

However the column cap 28 is secured to the vertical columns 24, 26, the column cap 28 may include a left upper flap 64 extending from a top edge 66 of the left flange 46 and a right upper flap 68 extending from a top edge 70 of the right flange 48. The left and the right upper flaps 64, 68 may be co-planar. Further, the left upper flap 64 and the right upper flap 68 may be located on a plane that is perpendicular from the left and right flanges 46, 48 and also perpendicular to a center axis 58 of the channel 38. These upper flaps 64, 68 are configured to provide a surface for a horizontal beam 20 to rest. The plane of the flaps 64, 68 may be substantially horizontal with respect to the ground, thereby allowing the horizontal beam 18, 20 having a circular cross section to rest easily on top of the column cap 28 during installation. In other embodiments, the flaps may be bent at some other angle to permit the horizontal beam 18, to run parallel to a sloped ground surface.

Furthermore, the upper flaps 64, 68 each extend into the cross section defined by the channel 38. This is shown in the Figures as extending element 72. While the extending element 72 is shown in the Figures to only extend minimally into the cross section defined by the channel 38, other embodiments may include much larger flaps that extend almost all the way into the center of the channel 38. In other embodiments, the flaps may even be connected. However, the upper flaps 64, 68 shown in the Figures are not directly connected.

This may be desirable due to manufacturing, machining, and deforming constraints, as described hereinbelow with respect to the process by which the column cap 28 may be bent from a flat sheet. Whatever the embodiment, the upper flaps 64, 68 may act as a stopper when the column cap 28 is slid onto the extended end 30 of the vertical column 24, 26. This allows the column cap 28 to rest in a desirable position prior to and during tightening to the vertical column 24, 26 by the U-clamps 62.

The upper flaps 64, 68 each include an opening 74 that is configured to receive an end of a U-bolt 76 such that the U-bolt 76 extends from both upper flaps 64, 68 above the column cap 28. The U-bolt 76 may be utilized to secure the horizontal beam 20 to the upper flaps 64, 68 of the column cap 28. Because the flaps 64, 68 are connected to the left and right flanges 46, 48, the flaps 64, 68 are prevented from deforming or bending from the force from the two ends of the U-bolt 76 when the U-bolt 76 is tightened.

The column cap 28 may be created with a metal stamping process, bending process or the like. The column cap 28 may be made from a metallic material, such as steel, stainless steel, iron or the like. However, the column cap 28 is not limited to this embodiment. It should be understood that the column cap 28 may be made from any material that is structurally robust enough to support the loading from the horizontal beams 18, 20. The column cap 28 and various other components of the solar array support structure 10 may further be hot dipped galvanized.

Figure 3:
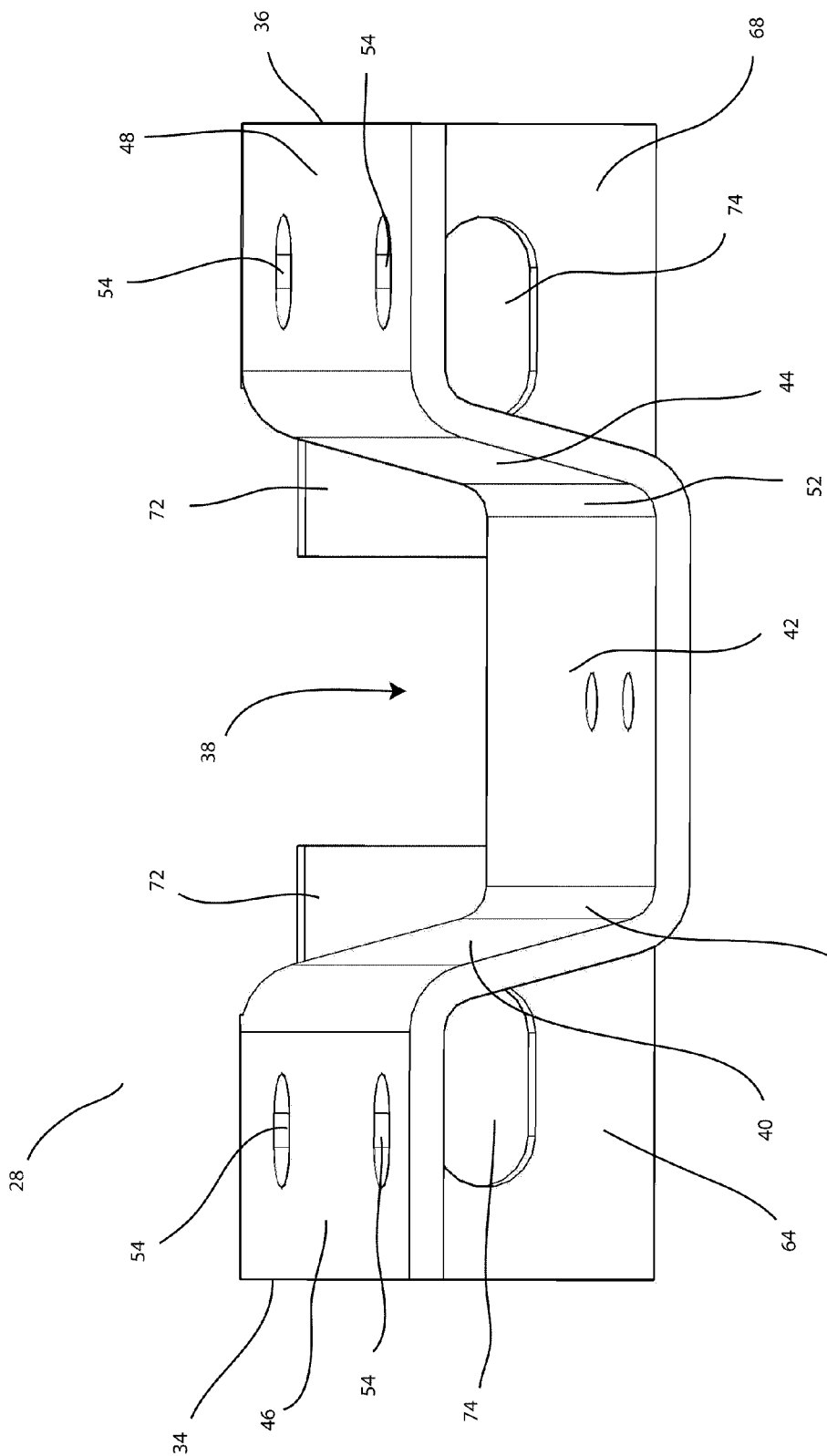
FIG. 3 depicts a perspective view of a main body of the column cap of FIG. 2 without attached clamps in accordance with one embodiment.

In one embodiment, the column cap 28 may first be cut or otherwise shaped into a planar sheet (not shown) having the appropriate dimensions. At this stage, the sheet may include the material that will later comprise the main body 32, the flanges 46, 48 and the flaps 64, 68 extending from the flanges 46, 48. Thus, the sheet may include a substantially rectangular portion, with the two flaps 64, 68 extending from the top edge. The openings 54, 56, 74 may be cut into this flat sheet prior to forming or bending or otherwise shaping the sheet. Once this is accomplished, the upper flaps 64, 68 may then be bent. In one embodiment, the flaps 64, 68 are bent 90 degrees, as shown in the Figures. Once the flaps 64, 68 are bent, the channel 38 may then be fashioned by bending the main body 32 at the bends 50, 52. Once these bends have been fashioned, the flanges 46, 48 may be bent into the position shown in the Figures. It should be understood that this process is strictly exemplary and is not limiting. For example, the channel 38 may be fashioned such that it has a semi-cylindrical cross section to more closely surround the vertical column 24, 26 as described hereinabove. The final form after all of these bends and metalworking has been completed is shown in FIG. 3.

Figure 4:
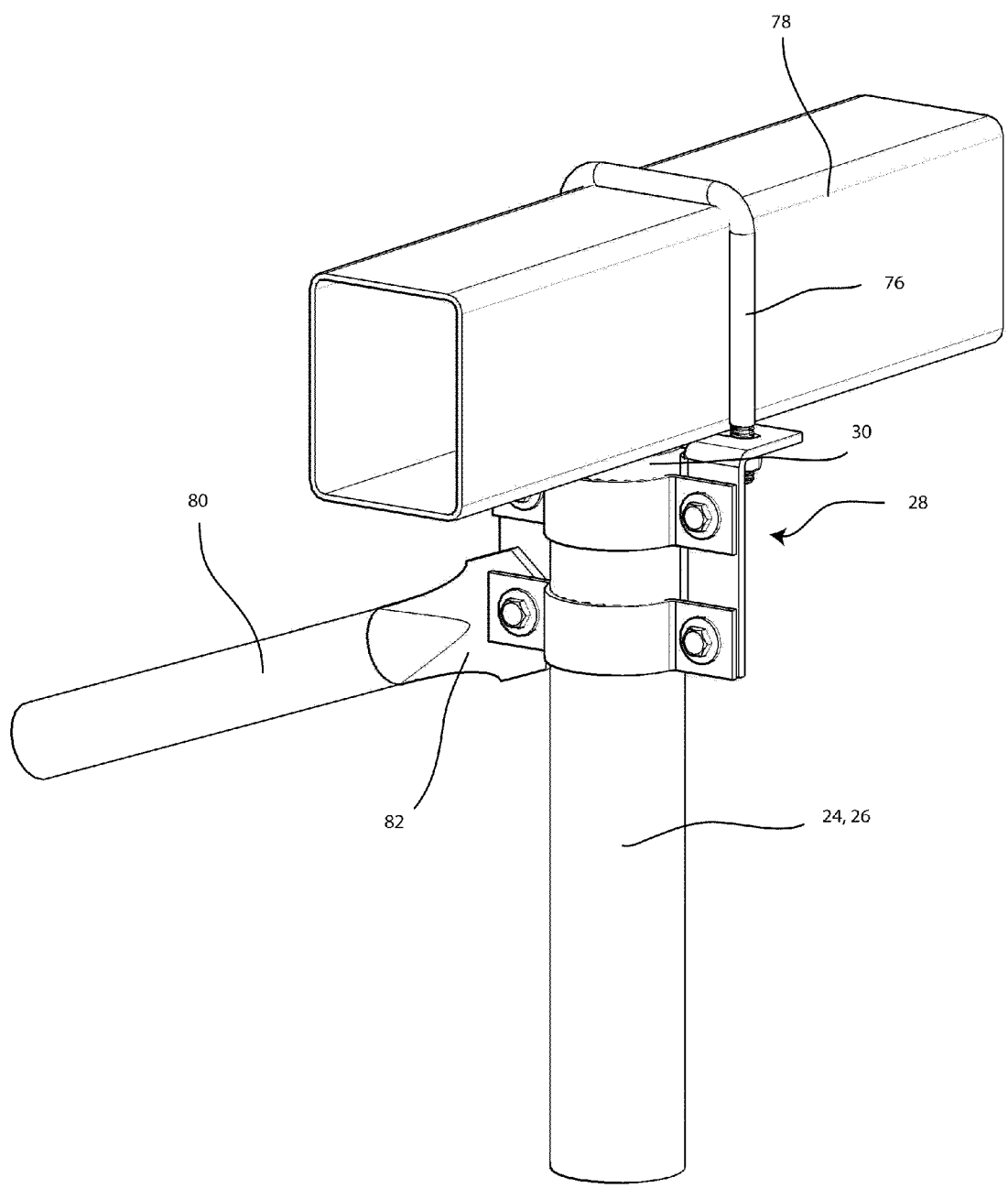
FIG. 4 depicts a perspective view of the column cap of FIGS. 2-3 attaching a vertical column with a horizontal beam having a rectangular cross section in accordance with one embodiment.

Referring now to FIG. 4, the column cap 28 is shown after installation on one of the circular cross sectioned vertical columns 24, 26. A horizontal beam 78 having a rectangular cross section is resting on the flaps 64, 68 of the column cap 28. In this embodiment, the column cap 28 is shown to be utilized for connecting a horizontal cross beam 80 to the solar array support structure 10. The horizontal cross beam 80 is also shown in FIG. 1. The horizontal cross beam 80 may help to distribute horizontal loading of the solar array support structure 10 to the rear vertical column 24. In this embodiment, the horizontal cross beam 80 may include a flattened end 82 for insertion between the U-clamp 62 and one of the flanges 46, 48 and secured with one of the bolts 60.

Figure 5:
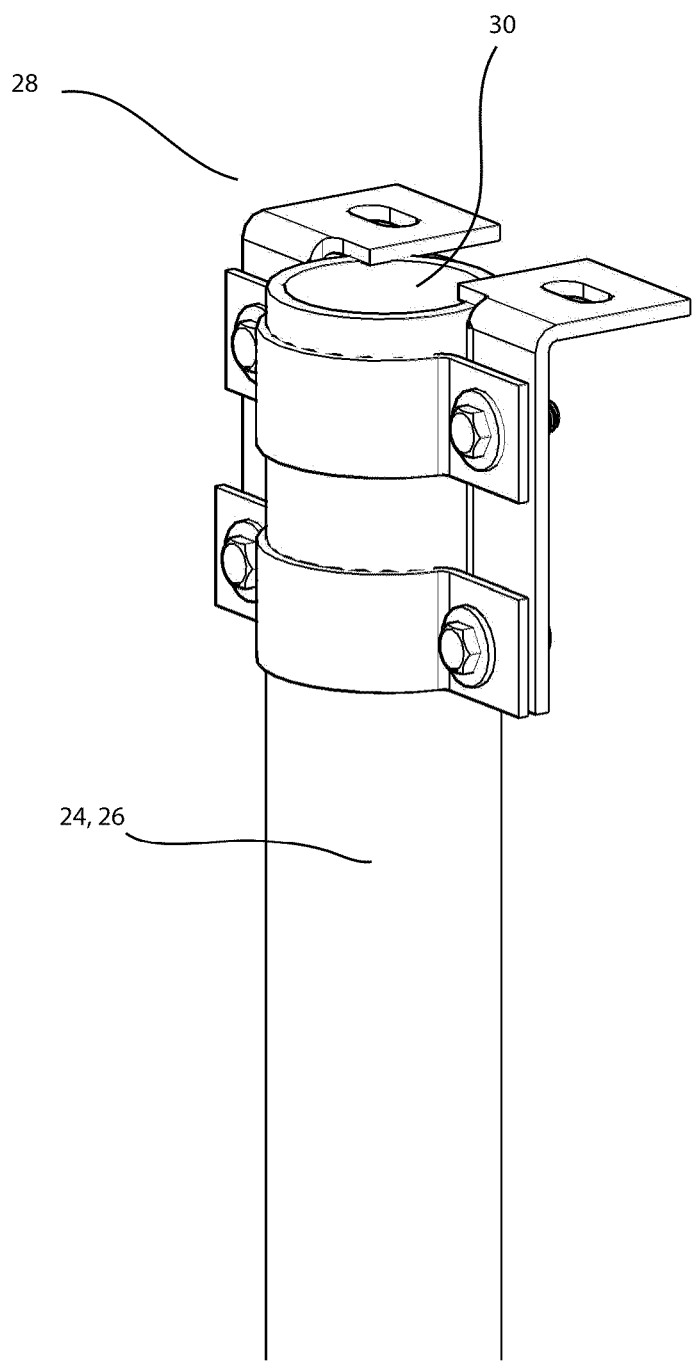
FIG. 5 depicts a perspective view of the column cap of FIGS. 2-4 resting on a vertical column in accordance with one embodiment.

FIG. 5 shows a column cap 28 resting on a circular cross sectioned vertical column 24, 26 prior to installation of a horizontal beam. While the U-clamps 62 have been tightened to the flanges 46, 48, the U-bolt 76 has not yet been applied. FIG. 5 has been included to show more clearly the extending elements 72 of the upper flaps 64, 68. As shown in the Figure, the bottom right edge of the left upper flap 64 and the bottom left edge of the right upper flap 68 extend into the cross section of the channel 38 and the vertical column 24, 26 to act as a stopper and further support a horizontal beam.

Figure 6:
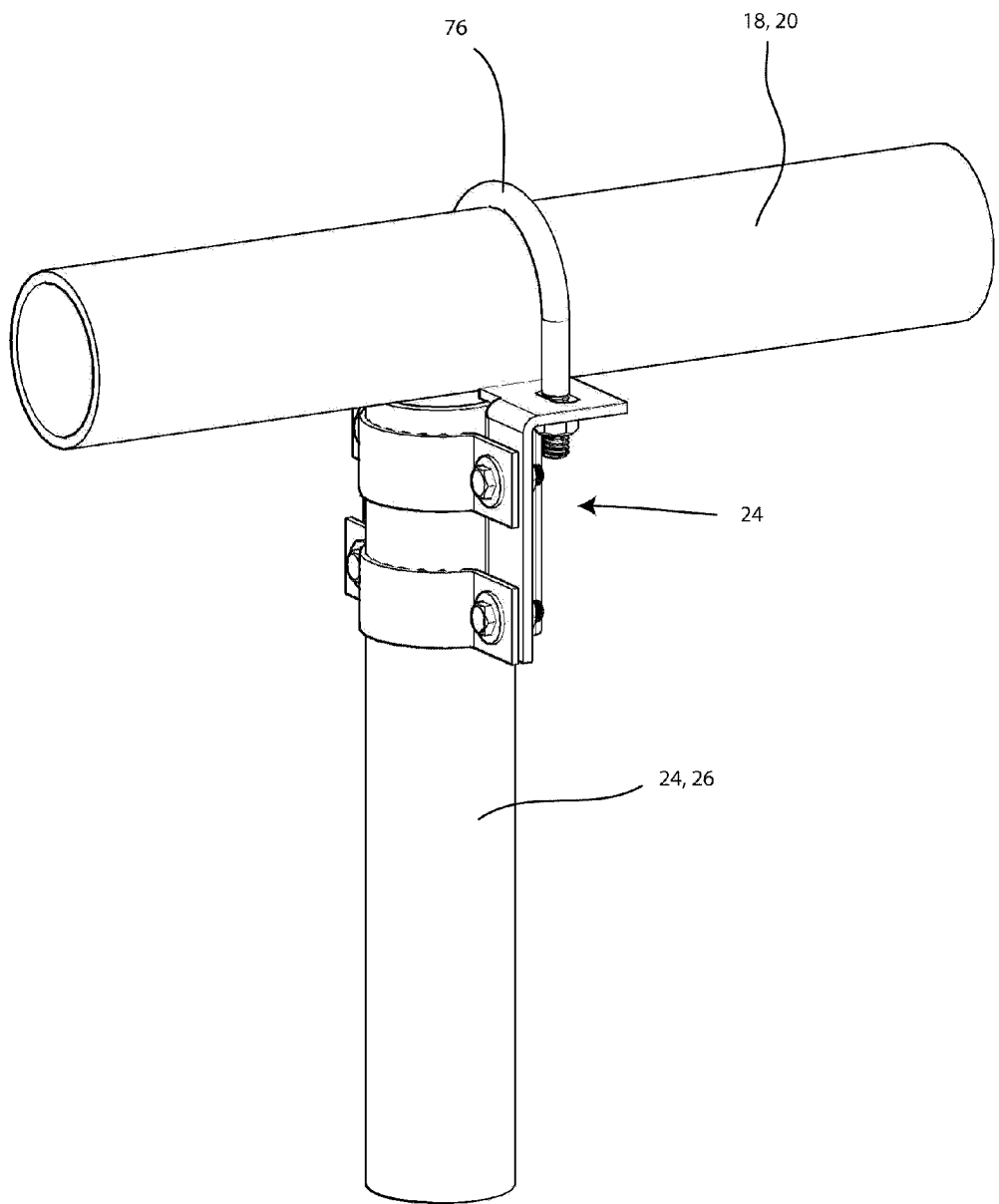
FIG. 6 depicts a perspective view of the column cap of FIGS. 2-5 attaching a vertical column with a horizontal beam having a circular cross section in accordance with one embodiment.

FIG. 6 depicts a perspective view of the column cap 28 after installation on one of the circular cross sectioned vertical columns 24, 26 and one of the horizontal beams 18, having a circular cross section. As such, the U-bolt 76 extending from the upper flaps 64, 68 are shown to be semi circular rather than squared. The flaps 64, 68 may accommodate bolts of any shape or size.

Referring back to FIG. 1, the horizontal beams 18, 20 and the vertical columns 24, 26 of the solar array support structure 10 may be manufactured from aluminum or steel or other like materials and may have generally circular cross sections, as shown in the Figures. It should be understood that the horizontal beams 18, 20 may not rest exactly horizontally with respect to the ground. The beams may rest at a slight angle to follow land contours. For example, the beams may slope anywhere between 0-20 degrees. The horizontal beams 18, 20 and the vertical columns 24, 26 are shown hollowed. However, the embodiment shown is not limiting. For example, the mounting structure may comprise components having rectangular or square cross sections. Furthermore, the terms "rail" and "column" are used for illustrative purposes to describe the horizontal beams 18, 20 and the vertical columns 24, 26. It should be understood that these components of the solar array support structure 10 may also be referred to as bars, rails, poles, shafts, pipes, tubes, beams and the like.

Whatever the construction of the mounting structure 14, the vertical columns 24 26 are configured to hold it above the ground 12 when the solar array support structure 10 is installed. The vertical columns 24, 26 may also arranged in pairs, each pair comprising one of the front support columns 26 and one of the rear support columns 24. Each pair may be located at the same point along the length 22 of the solar array support structure 10. In one embodiment, the support columns 24, 26 may be telescoping such that the height above the ground and angles are adjustable. While the support columns 24, 26 are shown having a circular cross section, the support columns 24, 26 may also have square or rectangular cross sections or the like. These embodiments are exemplary and should not be interpreted as limiting in any way.

These vertical columns 24, 26 may also include helical drives (not shown) at the rooted end to enable the columns 24, 26 to be driven into the ground 12 through rotation during the installation of the solar array support structure 10. These helical drives may also support the solar array support structure 10 in order to bear the vertical loading caused by the wind (both downward and upward), snow, weight of the structure, and the like. Alternately, driven piles or concrete masses may be utilized to sustain the vertical loading on these vertical columns 24, 26.

Figure 7:
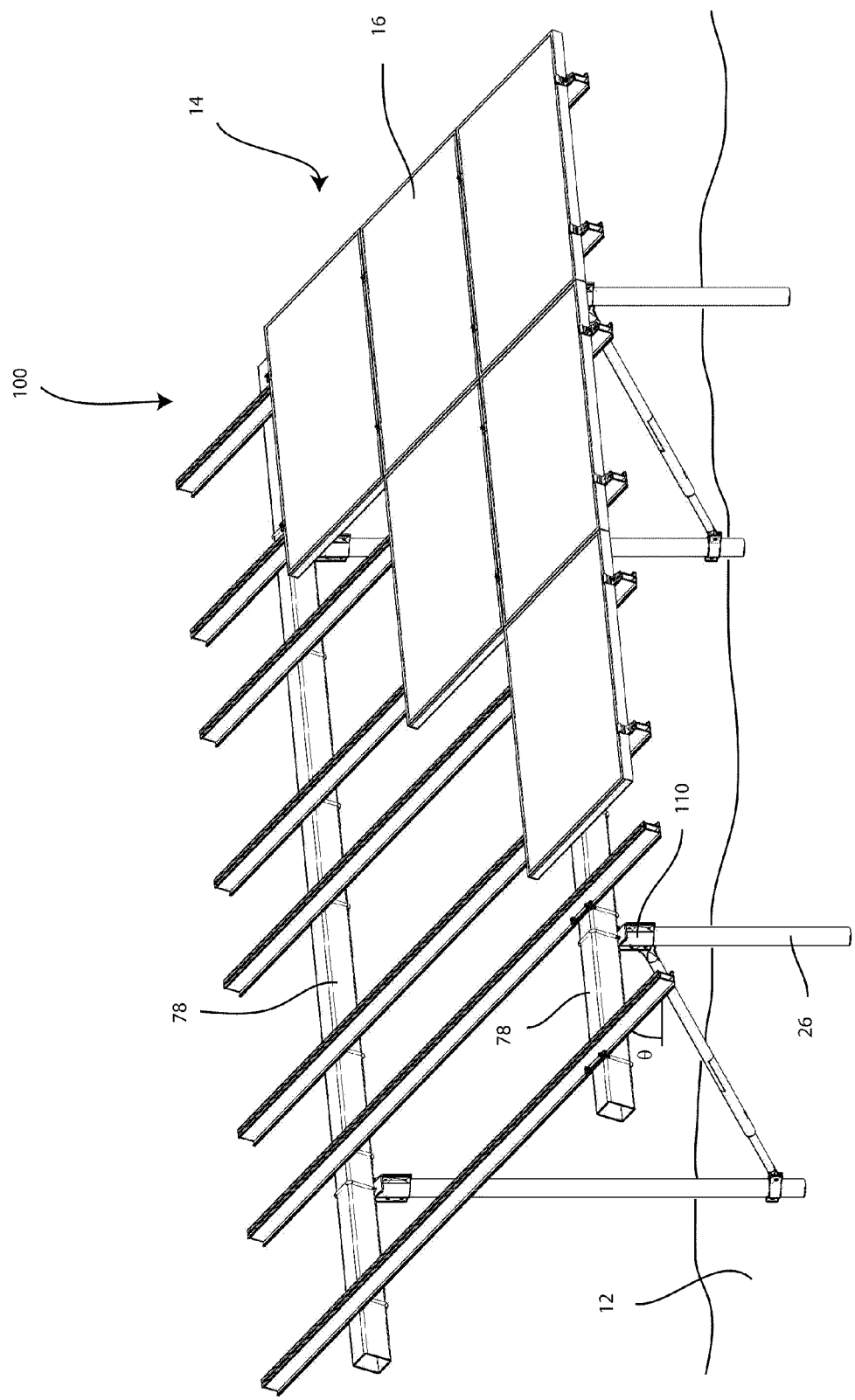
FIG. 7 depicts a perspective view of a solar array support structure in accordance with one embodiment.

Referring now to FIG. 7, another solar array support structure 100 is shown according to another described embodiment. This solar array support structure 100 is similar to the solar array support structure 10 described hereinabove. The solar array support structure 100 includes the rectangular cross section horizontal beams 78. However, unlike the previous embodiments, the horizontal beams 78 rest on an angle θ with respect to the ground 12. This is accomplished because the solar array support structure 100 includes different column caps 110 on the vertical columns 24, 26 that include an angled surface upon which the horizontal beams 78 rest.

Figure 8:
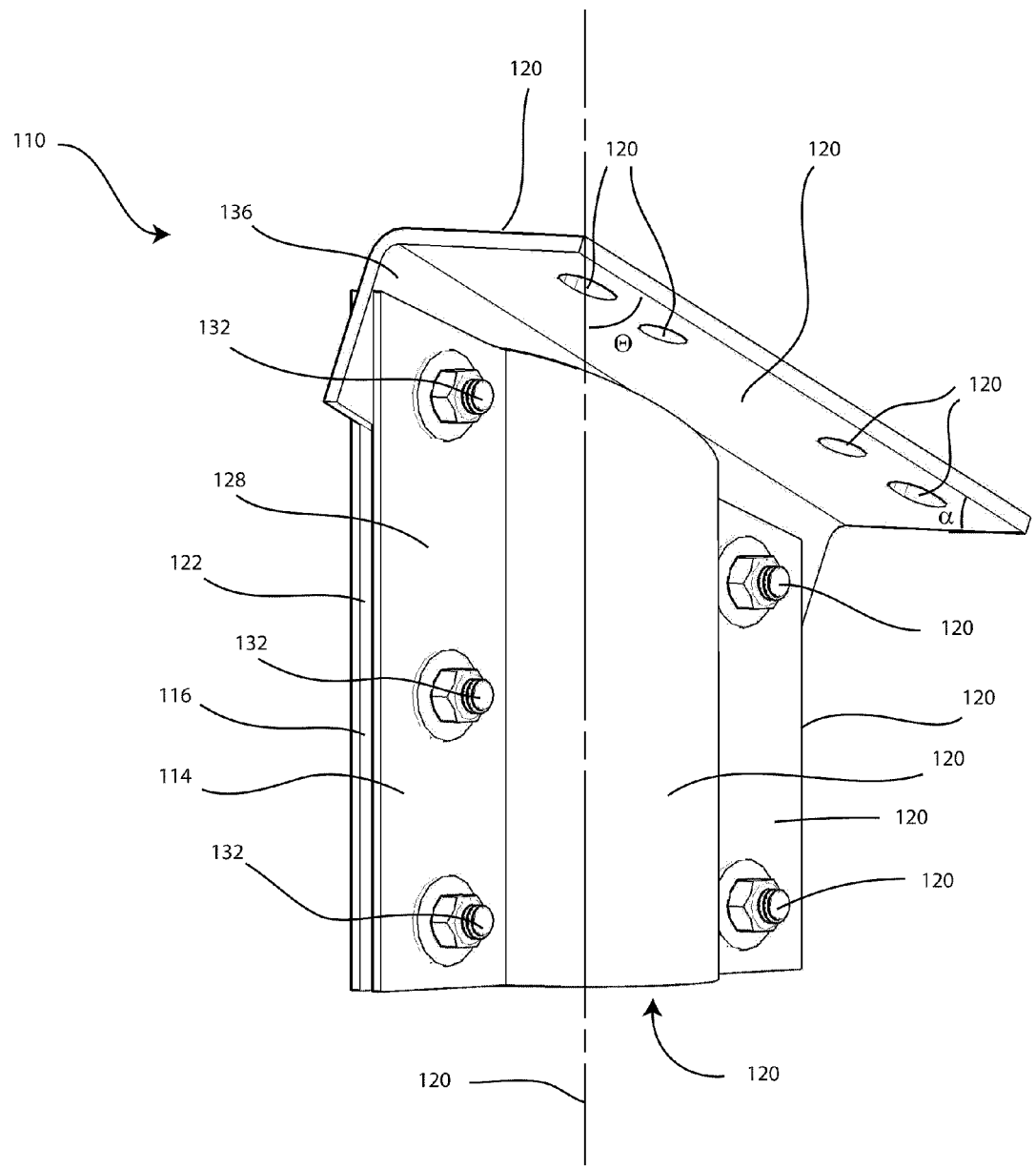
FIG. 8 depicts a perspective view of an column cap in accordance with one embodiment.

FIG. 8 depicts an embodiment of one of the angled column caps 110. The column cap 110 includes a body 112 that comprises a first body portion 114 and a second body portion 116. The body 112 in combination includes an opening 118 extending along a center axis 119. The opening 118 is configured to receive one of the vertical columns 24, 26 of the solar array support structure 100 such that the body 112 of the column cap 110 surrounds the vertical column 24, 26 in a similar manner to the embodiment described hereinabove. The column cap 110 further includes an upper support surface 120 configured to receive a horizontal beam. The upper support surface 120 is located at the angle θ with respect to the ground 12. Thus, the upper support surface 120 is located in a plane that is non-perpendicular with the center axis 120 of the column cap 110, and extends at an angle α with respect to the center axis 120. It should be understood that the angles θ, α may be altered depending on the desired angle of the solar array support structure 100 with respect to the ground.

Figure 9:
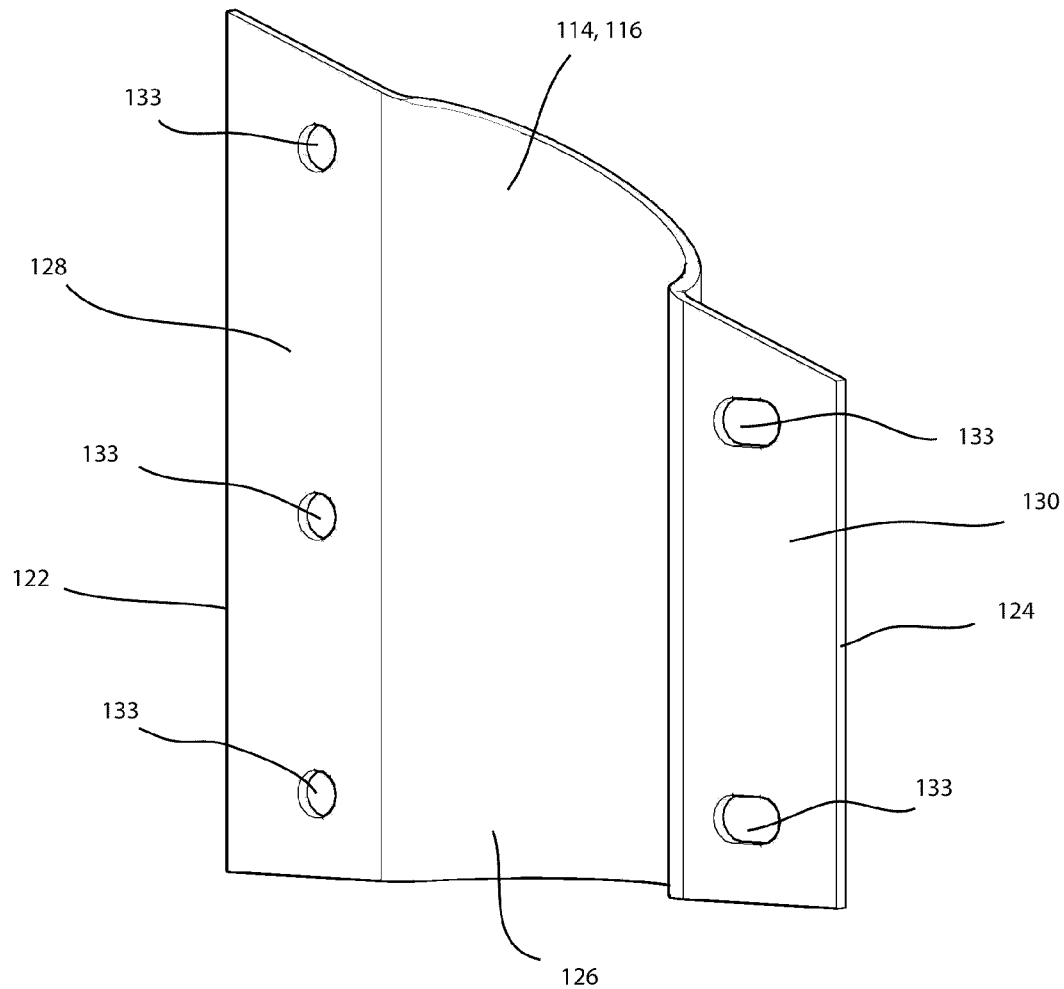
FIG. 9 depicts a perspective view of a body component of the column cap of FIG. 8 in accordance with one embodiment.

A perspective view of one of the body portions 114, 116 is shown in FIG. 9. The body portion 114, 116 extends between a left side 122 and a right side 124 to define a channel 126. The channel 126 is configured to define half of the opening 118 and is thus configured to at least partially surround the vertical column 24, 26. The body portion 114, 116 includes a left flange 128 that extends radially outwardly from the channel 126 and a right flange 130 that extends radially outwardly from the channel 126. Thus, the body portion shown in FIG. 9 may be either the first body portion 116 or the second body portion 116, as these body portions 114, 116 may be structurally similar or the same.

In the embodiment depicted, the channel 126 is semi-cylindrical in shape. Thus, the combination of the first body portion 114 and the second body portion 116 create an opening 118 that is substantially cylindrical and has a substantially circular cross section. However, this embodiment is not limiting. For example, the channel may include bends, such as the embodiment described hereinabove with respect to the column cap 28. In some cases, the vertical column may have a square or rectangular cross section for example, necessitating an opening having a different cross section.

The first body portion 114 and the second body portion 116 may be connected at the flanges 128, 130 with a plurality of bolts 132. In the embodiment depicted, the left side 122 of the body 112 is larger than the right side 124. As such, the left flange 128 includes three bolts 132 while the right flange 130 includes only two bolts 132. However, this embodiment is not limiting and either side may include more or less bolts depending on the mechanical properties of the bolts and the forces expected in the system. The flanges 128, 130 may each contain a number of openings 133 to accommodate the bolts 132. In one embodiment, some of the openings 133 may be elongated in order to accommodate tolerances for ease of construction.

In the embodiment depicted, the upper support surface 120 is actually a first angle portion of a bent plate 134. The bent plate 134 also includes a second angle portion 136 extending perpendicular from the upper support surface 120, parallel to the center axis 119 of the opening 119. The two angle portions may be equal in width, or may alternately be different widths. The bent plate 134 may extend from the left side 122 to the right side 124 to provide a sufficient surface to rest the horizontal beam 78. The bent plate 134 further allows for field bending in order to adjust the angle if the solar array is following site contour. For example, in some cases, it may be desirable that the bent plate 134 may be an 80 degree bend or a 100 degree bend, rather than a 90 degree bend.

The bent plate 134 may include a plurality of openings 138 in the upper support surface 120. The openings 138 may be configured to receive one of the U-bolts 76 (shown in FIG. 10). The upper support surface 120 may include various openings 138 in order to provide options to an installer. This may allow an installer to attach the bent plate 134 in the opposite orientation to the body 112 without affecting the location of the horizontal beam 78. This relocation helps to resolve interference issues with aluminum rail placement. With the bent plate 134 that is able to be installed in either direction, the column cap 110 is not rotated but the bent plate 134 can be rotated such that the angle points in the opposite direction to resolve potential interference issues. The second angle portion 136 may also include an opening at each side in order to each receive one of the bolts 132 that secures the two body portions 114, 116 together. Thus, the top bolts 132 on each side 122, 124 of the body 112 may additionally secure the bent plate 134 to the body 112 in addition to secure the first body portion 114 with the second body portion 116.

Figure 10:
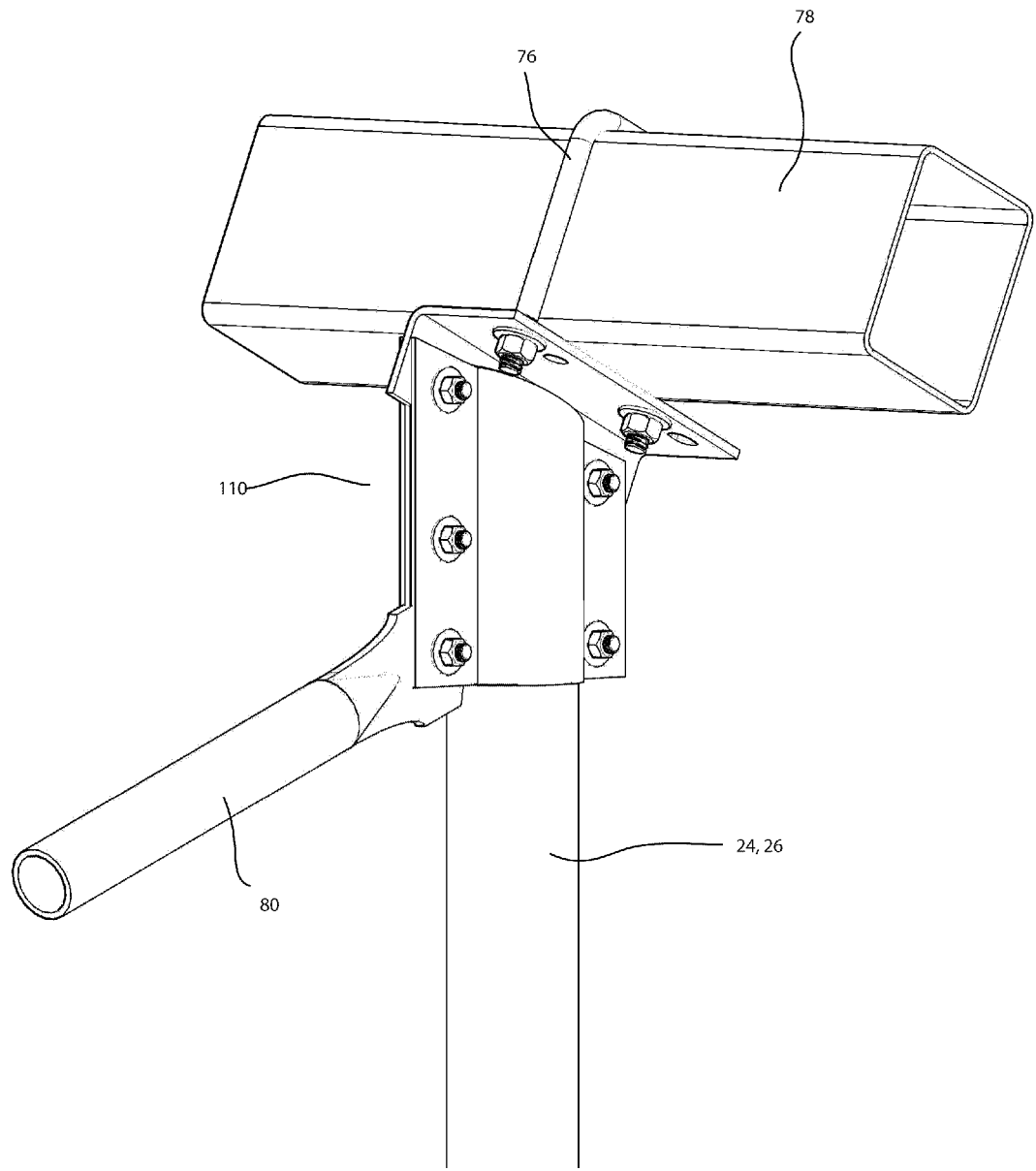
FIG. 10 depicts a perspective view of the end clamp of FIGS. 8-9 attaching a vertical column with a horizontal beam having a rectangular cross section in accordance with one embodiment.
Figure 11:
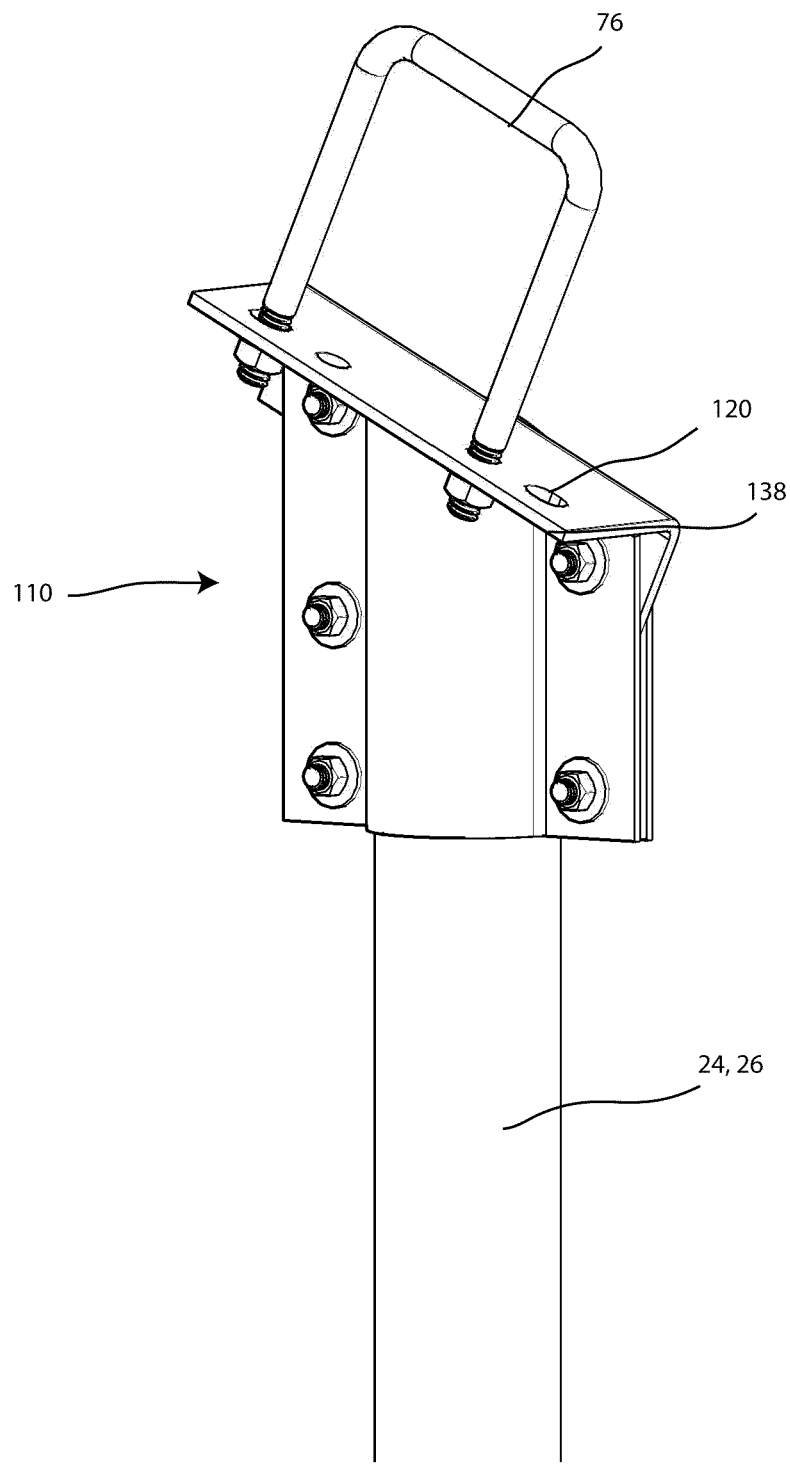
FIG. 11 depicts a perspective view of the column cap of FIGS. 8-10 resting on a vertical column in accordance with one embodiment.
Figure 12:
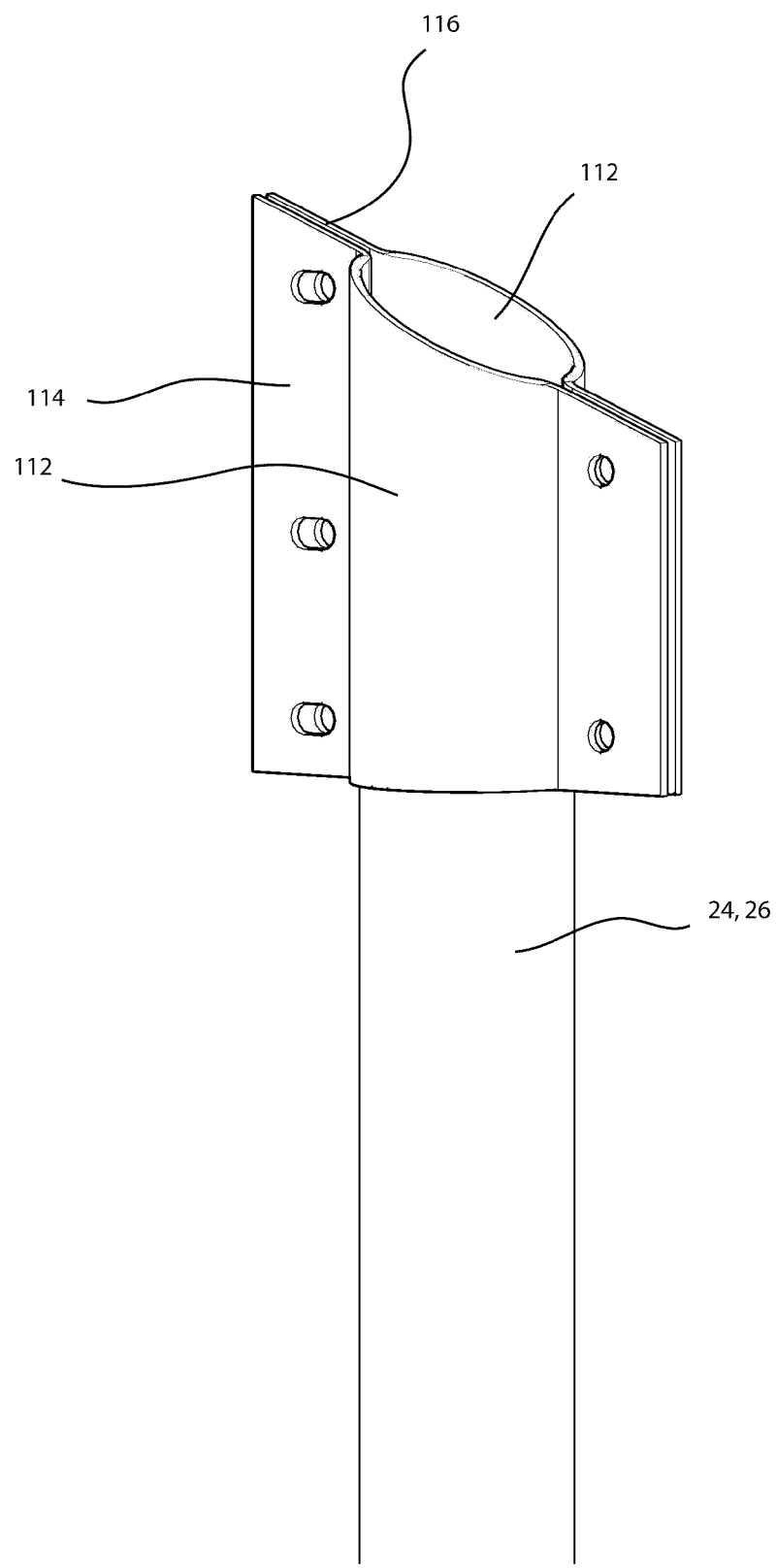
FIG. 12 depicts a perspective view of two body components of the column cap of FIGS. 8-11 surrounding a vertical column prior to bolting the two body components together and prior to attachment of an angle iron resting component.

Referring now to FIG. 10, the column cap 110 is shown after installation on the vertical column 24, 26, with one of the horizontal beams 78 bolted to the upper support surface 120. By providing a solar array support surface with angled horizontal beams 78, the solar panels rest nicely at this angle. Further, wind loading is more evenly distributed within the horizontal beam 78. Furthermore, FIG. 10 shows that, like the column cap 28, a horizontal cross beam 80 may also be installed directly to one of the lower bolts 132 of the column cap 110. FIG. 11 shows the column cap 110 in a similar position installed on the vertical column 24, 26 with the horizontal beam 78 removed for illustrative purposes. FIG. 12 shows the two body portions 114, 116 surrounding the vertical column 24, 26 with the bent plate 136, bolts 132, and U-bolt 76 removed. Again, this is for illustrative purposes in order to more clearly reveal the shown components.

Figure 13:
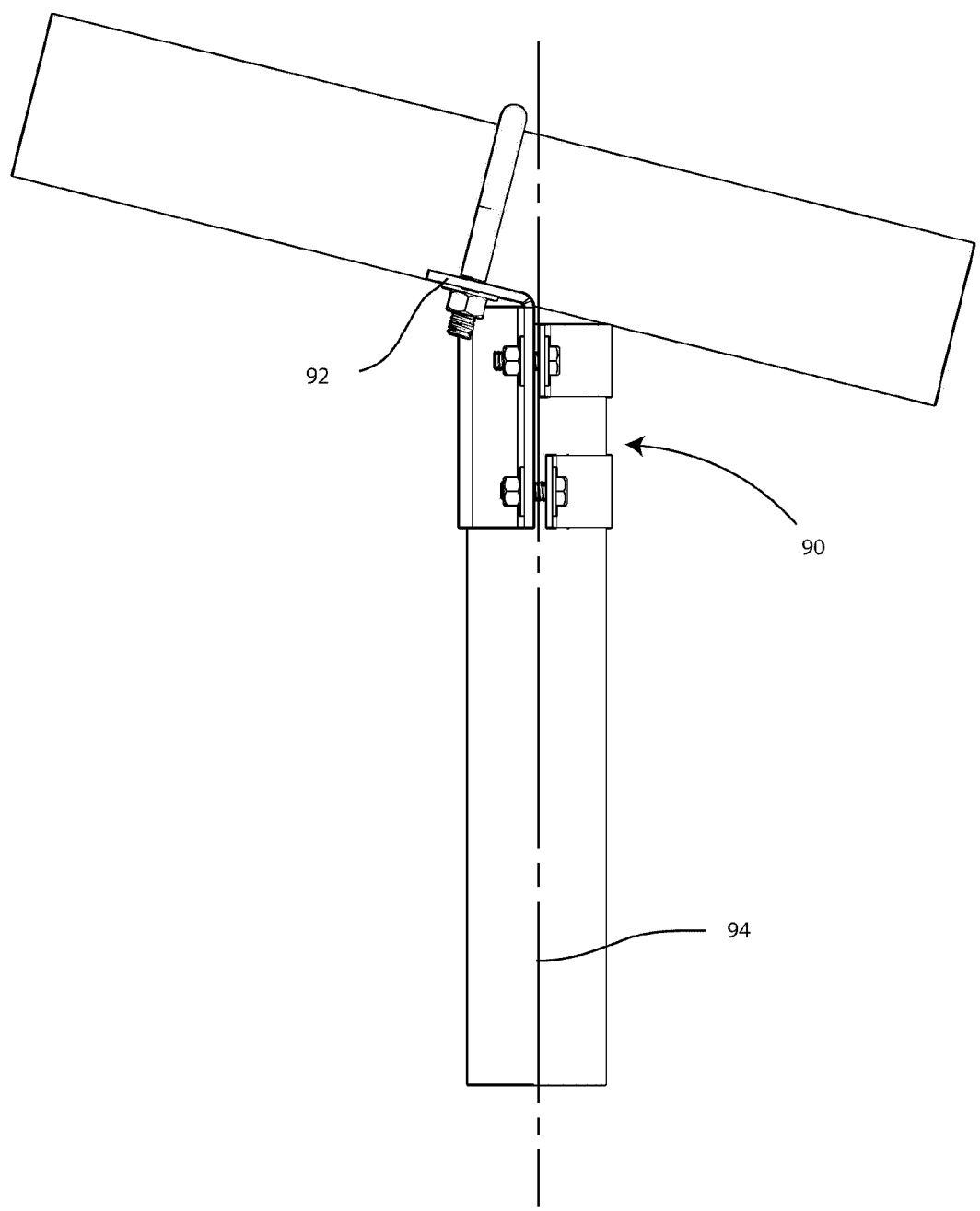
FIG. 13 depicts another column cap in accordance with one embodiment.

It should be understood that the embodiment depicted is not limiting. Other means for achieving an angled upper support surface are contemplated. For example, many of the features of the embodiment of the column cap 28 may be utilized, as shown in FIG. 13. This Figure shows a column cap 90 that is similar to the column cap 28. However, it is contemplated that an angled support surface 92 may be achieved if the flaps are angled with respect to the center axis 94 instead of perpendicular, thereby creating the desired angle. In other embodiments, the support surface may be an integral feature of the body 112 similar to the flaps 64, 68, rather than requiring bolts like the bent plate 136.

Like the column cap 28, the column cap 110 may be created with a metal stamping process, bending process or the like. The column cap 110 may also be made from a similar metallic material, such as steel, stainless steel, iron or the like. It should be understood that the column cap 110 may be made from any material that is structurally robust enough to support the loading from the horizontal beams 18, 20, 78. The column cap 28 and various other components of the solar array support structure 10 may further be hot dipped galvanized.

Figure 14:
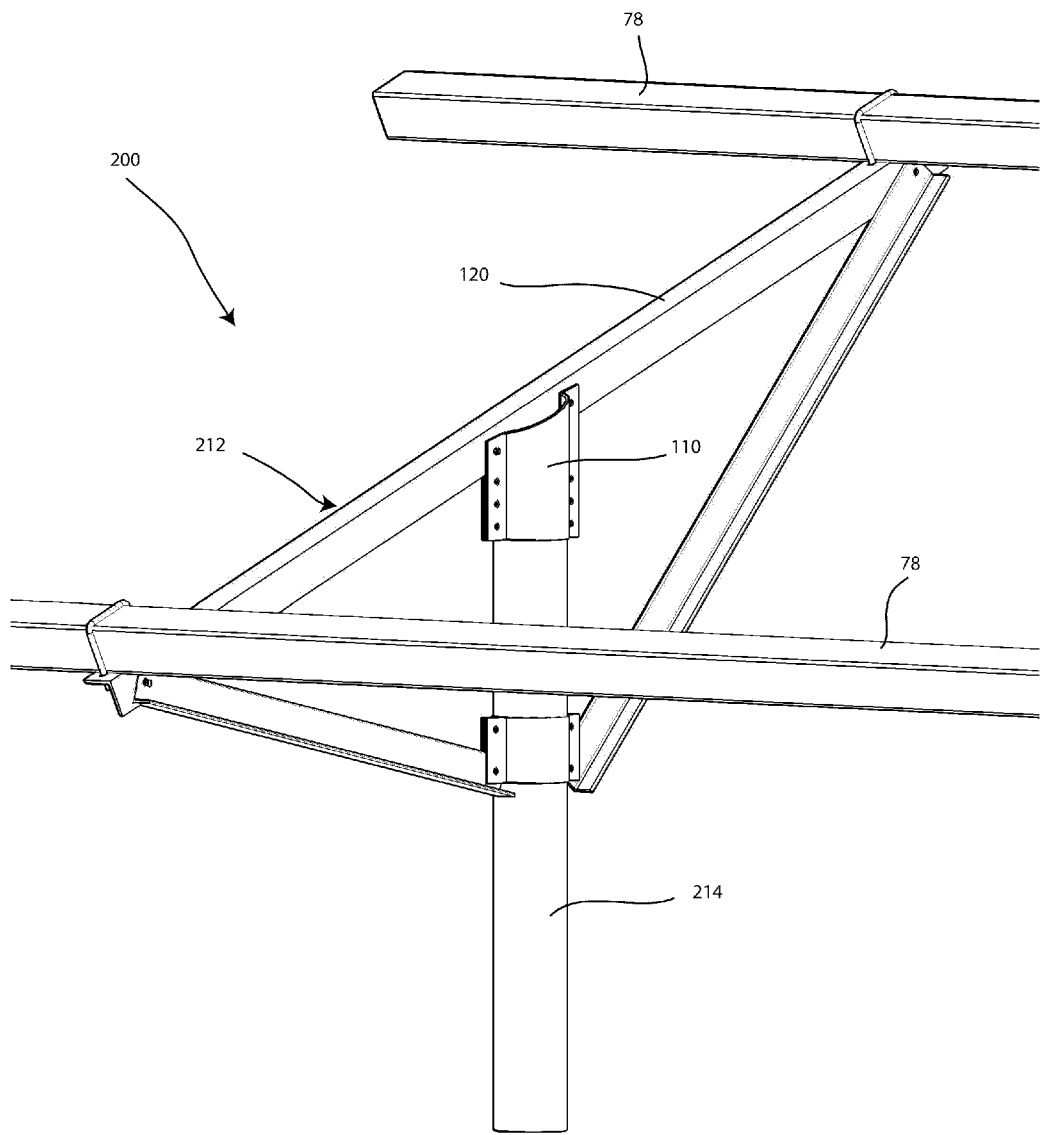
FIG. 14 depicts a perspective view of the column clamp of FIGS. 9-12 with an extended bent plate in accordance with one embodiment.

Referring now to FIG. 14, another solar array support structure 200 is shown with one of the column caps 110. However, unlike the previous embodiment, the support surface 120 is shown as an extended bent plate 212. In this embodiment, a single vertical column 214 may be utilized that is located at a midpoint of the width of the solar array support structure 200, rather than two vertical columns located at the front and rear as shown in other embodiments described hereinabove. The extended bent plate 212 extends the entire width between the two horizontal beams 78. In other respects, the solar array support structure 200 may be similar to the solar array support structure 100 described hereinabove.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A solar array column cap comprising:
   a main body extending between a left side and a right side to define a channel, the channel configured to at least partially receive a vertical column of a solar array support structure such that the main body surrounds the vertical column;
   a left flange extending radially outwardly from the left side of the channel;
   a right flange extending radially outwardly from the right side of the channel;
   a left upper flap extending from a top edge of the left flange; and
   a right upper flap extending from a top edge of the right flange, the right upper flap and left upper flap being co-planar, the left upper flap configured to receive a first end of a U-bolt and the right upper flap configured to receive a second end of the U-bolt such that the solar array column cap is configured to retain a horizontal beam in a position above the solar array column cap, wherein the left upper flap and the right upper flap are not directly connected.

2. The solar array column cap of claim 1, wherein the channel is defined by a left wall, a middle wall and a right wall and wherein a first bend separates the left wall and the middle wall and a second bend separates the middle wall and the right wall.

3. The solar array column cap of claim 2, wherein a third bend is located between the left flange and the left wall, and wherein a fourth bend is located between the right flange and the right wall.

4. The solar array column cap of claim 1, wherein the left upper flap and the right upper flap each include an opening that is configured to receive an end of a U-bolt.

5. The solar array column cap of claim 1, wherein the left upper flap and the right upper flap are located on a plane that is perpendicular from the left and right flanges and a center axis of the channel.

6. The solar array column cap of claim 1, wherein the left flange and the right flange are co-planar.

7. The solar array column cap of claim 1, wherein the left flange and the right flange each include an opening that is configured to receive an end of a U-bolt.

8. The solar array column cap of claim 7, further comprising a U-clamp bolted to a third and a fourth opening of the left flange and the right flange.

9. The solar array support structure of claim 1, wherein the left upper flap and the right upper flap extend into the cross section defined by the channel.

10. A solar array support structure comprising:
    a vertical column extending from the ground to an upper end;
    a column cap attached to the upper end of the vertical column, the column cap including:
    a main body defining a channel extending at least partially around the vertical column;
    a left flange extending from the main body radially outwardly with respect to the vertical column;
    a right flange extending from the main body radially outwardly with respect to the vertical column;
    a left upper flap extending from a top edge of the left flange; and
    a right upper flap extending from a top edge of the right flange, the right upper
    flap and the left upper flap being co-planar;
    a horizontal beam resting on the column cap; and
    a U-bolt connecting the horizontal beam to the left and right upper flaps, the U-bolt extending between the left upper flap and the right upper flap;
    wherein the channel is defined by a left wall, a middle wall and a right wall and wherein a first bend separates the left wall and the middle wall and a second bend separates the middle wall and the right wall, and wherein a third bend is located between the left flange and the left wall, and wherein a fourth bend is located between the right flange and the right wall.

11. The solar array support structure of claim 10, wherein the left upper flap and the right upper flap each include an opening that is configured to receive an end of a U-bolt.

12. The solar array support structure of claim 10, wherein the left upper flap and the right upper flap are located on a plane that is perpendicular from the left and right flanges and a center axis of the channel.

13. The solar array support structure of claim 10, wherein the left flange and the right flange are co-planar.

14. The solar array support structure of claim 10, wherein the left flange and the right flange each include an opening that is configured to receive an end of a U-bolt.

15. The solar array support structure of claim 14, further comprising a U-clamp bolted to a third and a fourth opening of the left flange and the right flange, wherein the combination of the U-clamp and the channel fully surround the vertical column.

16. The solar array support structure of claim 10, wherein the left upper flap and the right upper flap extend into the cross section defined by the channel such that the column cap rests on the vertical column and the left upper flap and the right upper flap are prevented from moving past the upper end of the vertical column.

17. The solar array support structure of claim 10, wherein the horizontal beam has a circular cross section.

18. A solar array column cap comprising:
    a main body extending between a left side and a right side to define a channel, the channel configured to at least partially receive a vertical column of a solar array support structure such that the main body surrounds the vertical column;
    a left flange extending radially outwardly from the left side of the channel;

a right flange extending radially outwardly from the right side of the channel;

a left upper flap extending from a top edge of the left flange; and a right upper flap extending from a top edge of the right flange, the right upper flap and left upper flap being co-planar, the left upper flap configured to receive a first end of a U-bolt and the right upper flap configured to receive a second end of the U-bolt such that the solar array column cap is configured to retain a horizontal beam in a position above the solar array column cap, wherein the channel is defined by a left wall, a middle wall and a right wall and wherein a first bend separates the left wall and the middle wall and a second bend separates the middle wall and the right wall, and wherein a third bend is located between the left flange and the left wall, and wherein a fourth bend is located between the right flange and the right wall.

19. A solar array column cap comprising:

a main body extending between a left side and a right side to define a channel, the channel configured to at least partially receive a vertical column of a solar array support structure such that the main body surrounds the vertical column;

a left flange extending radially outwardly from the left side of the channel;

a right flange extending radially outwardly from the right side of the channel, wherein the left flange and the right flange each include an opening that is configured to receive an end of a U-bolt;

a left upper flap extending from a top edge of the left flange;

a right upper flap extending from a top edge of the right flange, the right upper flap and left upper flap being co-planar, the left upper flap configured to receive a first end of a U-bolt and the right upper flap configured to receive a second end of the U-bolt such that the solar array column cap is configured to retain a horizontal beam in a position above the solar array column cap; and a U-clamp bolted to a third and a fourth opening of the left flange and the right flange.

20. A solar array support structure comprising:

a vertical column extending from the ground to an upper end;

a column cap attached to the upper end of the vertical column, the column cap including:

a main body defining a channel extending at least partially around the vertical column;

a left flange extending from the main body radially outwardly with respect to the vertical column;

a right flange extending from the main body radially outwardly with respect to the vertical column, wherein the left flange and the right flange each include an opening that is configured to receive an end of a U-bolt;

a left upper flap extending from a top edge of the left flange;

a right upper flap extending from a top edge of the right flange, the right upper flap and the left upper flap being co-planar; and a U-clamp bolted to a third and a fourth opening of the left flange and the right flange, wherein the combination of the U-clamp and the channel fully surround the vertical column;

a horizontal beam resting on the column cap; and a U-bolt connecting the horizontal beam to the left and right upper flaps, the U-bolt extending between the left upper flap and the right upper flap.

* * * * *